United States Patent [19]

Randle

[11] Patent Number: 4,936,268
[45] Date of Patent: Jun. 26, 1990

[54] BALANCERS FOR MULTICYLINDER RECIPROCATING INTERNAL COMBUSTION ENGINES OR COMPRESSORS

[75] Inventor: Steven J. Randle, Baginton, England

[73] Assignee: Jaguar Cars Limited, United Kingdom

[21] Appl. No.: 368,256

[22] Filed: Jun. 19, 1989

[30] Foreign Application Priority Data

Jun. 21, 1988 [GB] United Kingdom ............... 8814683

[51] Int. Cl.$^5$ ............................................. F02B 77/00
[52] U.S. Cl. ................................. 123/192 B; 74/573 R
[58] Field of Search .................. 123/192 R, 192 B; 74/573 R, 603, 604

[56] References Cited

U.S. PATENT DOCUMENTS

| | | | |
|---|---|---|---|
| 2,739,574 | 3/1956 | Scheiterlein | 123/192 B |
| 3,106,195 | 10/1963 | Hanley | 123/192 B |
| 4,703,724 | 11/1987 | Candea et al. | 123/192 B |

FOREIGN PATENT DOCUMENTS

| | | |
|---|---|---|
| 819,193 | 6/18/1936 | France |
| 403,223 | 12/21/1933 | Great Britain |
| 3,625,246 | 7/25/1986 | Germany |

OTHER PUBLICATIONS

Patent Abstracts of Japan, Vol. 8, Number 244 (M–337) [1681] 9 November, 1984 & JP-A-59 121 237 (HINO JIDOSHA KOGYO K.K.) 13 July, 1984
Patent Abstracts of Japan, Vol. 3, Number 97 (M–69), 17 August, 1979 & JP-A-54 71 210 (NISSAN JIDOSHA K.K.) 6 July, 1979

Primary Examiner—Noah P. Kamen
Attorney, Agent, or Firm—Davis, Bujold & Streck

[57] ABSTRACT

A balancer has a pair of shafts disposed parallel to one another and being adapted to be driven at the same speed in opposite directions, each shaft has a pair of axially separated weights mounted thereon, all four weights being of equal mass. The weights on each shaft are disposed at different angular positions, the disposition of weights on one shaft being the same as that on the other shaft, each weight on one shaft being disposed at 180° to the corresponding weight on the other shaft when the centers of mass of the weights are disposed in the common axial plane of the shafts.

6 Claims, 2 Drawing Sheets

BALANCERS FOR MULTICYLINDER RECIPROCATING INTERNAL COMBUSTION ENGINES OR COMPRESSORS

BACKGROUND TO THE INVENTION

The present invention relates to balancers and in particular to balancers for multicylinder reciprocating internal combustion engines or compressors of V-configuration.

It is shown to use weights on counter-rotating shafts to balance vibrations of internal combustion engines. In a standard Lanchester balancer, the weights on each shaft are equal in mass, the weight on one shaft being displaced 180° relative to that on the other shaft when the centres of mass of the weights are disposed in the common axial plane of the shafts, so that as the weights rotate in opposite directions, the components of the forces produced by the weights in the plane containing the axes of rotation of the two shafts will cancel each other out while the components normal to said plane will reinforce one another producing a linear force.

If the weights of the Lanchester balancer are offset axially, the balancer will produce a force perpendicular to the common axial plane and also a couple about a perpendicular axis to the common plane and between the shaft axes. However, the linear force and rotating couple will be 90° of phase.

With multicylinder reciprocating internal combustion engines and compressors of V-configuration, there is a requirement for a linear balancing force and coaxial rotating couple which are in phase. In other applications it may be necessary to provide a balancing force and couple which differ in phase by an amount between 0° and 360°.

SUMMARY OF THE INVENTION

According to one aspect of the present invention a balancer comprises first and second shafts disposed parallel to one another and being adapted to be driven at the same speed in opposite directions, each shaft having a pair of axially separated weight mounted thereon, all four weights being of equal mass, the weights on each shaft being disposed at different angular positions, the disposition of the weights relative to one another on each shaft being the same, each weight on one shaft being disposed at 180° to the corresponding weight on the other shaft when the centres of mass of the weights are disposed in the common axial plane of the shafts.

BRIEF DESCRIPTION OF THE DRAWINGS

The invention is now described, by way of example only, with reference to the accompanying drawings in which.

DESCRIPTION OF A PREFERRED EMBODIMENT

Figure 1:
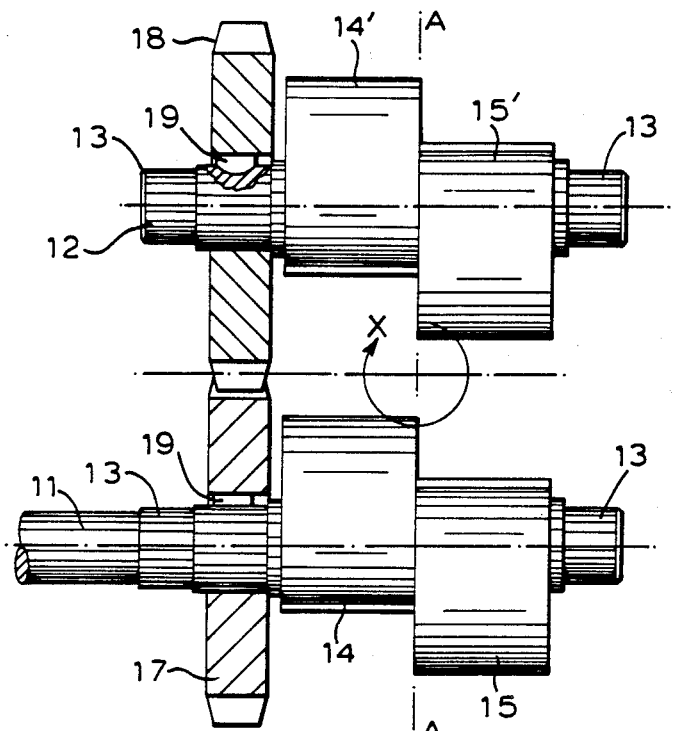
FIG. 1 shows a side elevation of an engine balancer formed in accordance with the present invention.
Figure 2:
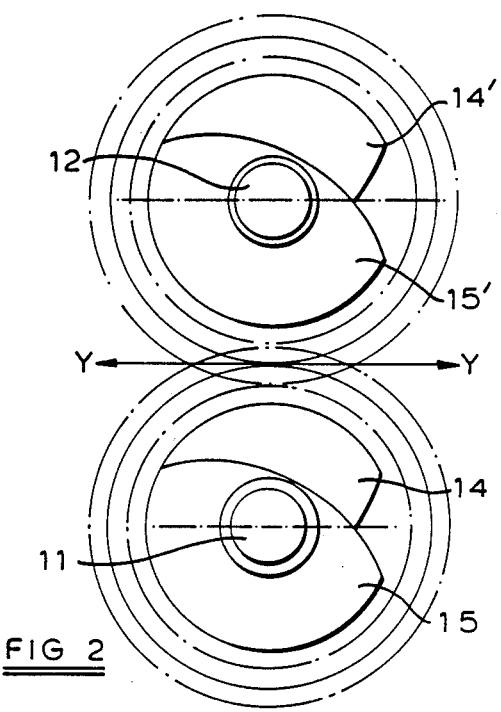
FIG. 2 shows an end elevation of the balancer illustrated in FIG. 1.

The balancer illustrated in FIGS. 1 and 2, which would typically be suitable for balancing a 60° V8 engine comprises a pair of shafts 11 and 12 which are mounted parallel to one another in or beside the crankcase of the engine. Shafts 11 and 12 are mounted in suitable bearings which engage journals 13, the axes of shafts 11 and 12 being in a vertical plane horizontally displaced from the crankshaft centreline, the shafts being positioned equal distances above and below said crankshaft centreline.

Each shaft 11 and 12 has a pair of axially separated weights 14, 15 and 14', 15' respectively, all four weights being of equal mass. Each pair of weights 14 and 15, and 14' and 15' are disposed one on either side of the transverse horizontal crankshaft centreline of the engine and are spaced equally therefrom. The weights 14 and 15, and 14' and 15' on each of the shafts 11 and 12 defining different diametral planes, the angle of separation of the weights 14 and 15 and 14' and 15' on each shaft being the same. The particular diametral plane discussed is a plane in which lie both the weight's center of mass and the shaft's axis of rotation.

A pair of gears 17 and 18 of equal diameter are mounted, one on each shaft 11 and 12, and are drivingly engaged therewith by means of keys 19. The gears 17 and 18 mesh with one another to transmit drive from one shaft to the other, the shafts 11 and 12 rotating at the same speed but in opposite directions. With the gears 17 and 18 in mesh, the shafts 11 and 12 are aligned so that the axially aligned weights 14 and 14' and 15 and 15' are disposed at 180° with respect to one another when the centres of mass of the weights 14 and 14', and 15 and 15' are in the common axial plane of the shafts 11 and 12.

Means 25 is provided on shaft 11 by means of which drive may be transmitted to shaft 11 at twice the speed of the crankshaft of the engine 30.

The balancer described above will produce a horizontal balancing force in the direction of arrow Y—Y, that is transverse of the longitudinal axis of the engine in phase with a couple in the direction of arrow X, that is about the transverse horizontal crankshaft centreline of the engine.

The magnitude of the force will depend upon the mass of the weights, the displacement of the centre of mass of the weights from the axes of the shafts and the relative angular position of the weights on the shaft, while the magnitude of the couple will depend upon the mass of the weights, the relative angular position of the weights on the shafts and the axial separation of the weights.

These parameters may consequently be adjusted to provide an appropriate combination of linear force and couple for a particular engine.

If the weights 14, 15 and 14', 15' on each of the shafts 11 and 12 of the balancer illustrated in FIG. 1 were positioned at 180° to one another, the balancer would produce a couple in the direction of arrow X but the balancing force will be zero.

Figure 3:
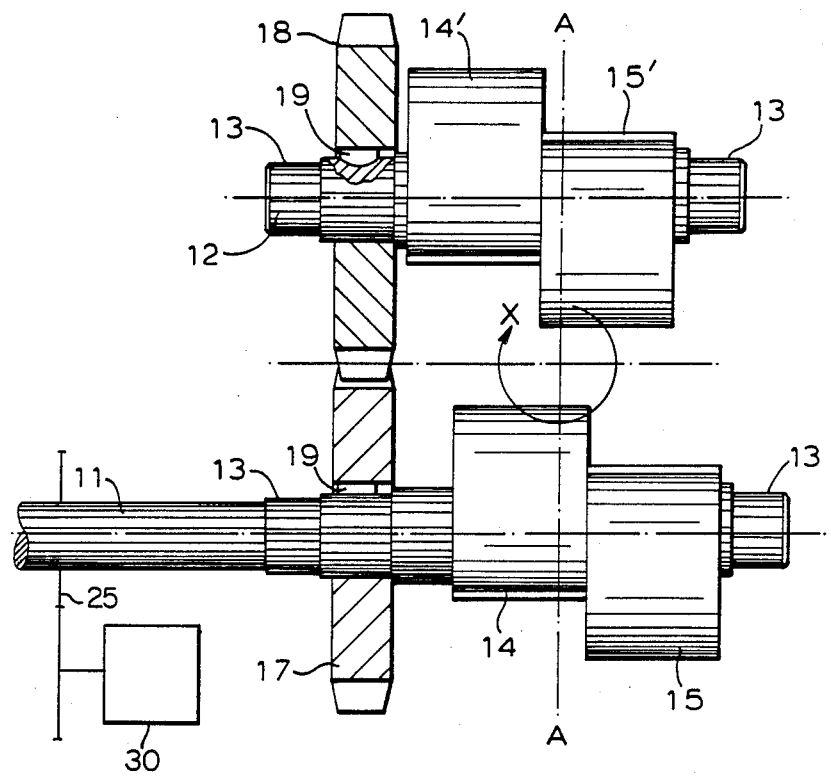
FIG. 3 shows a view similar to FIG. 1 of an alternative engine balancer formed in accordance with the present invention.

In the embodiment illustrated in FIG. 3, the weights 14, 15 and 14', 15' are positioned on each of the shafts 11 and 12, the weights 14, 15 on shaft 11 are disposed angularly relative to the weights 14', 15' on shaft 12 and the shafts 11 and 12 are driven in counter-rotating manner, as described with reference to FIGS. 1 and 2. The weights 14 and 15 on shaft 11 are however displaced axially of the weights 14' and 15' on shaft 12.

This arrangement will again produce a couple in the direction of arrow X and a force coaxially of the couple. However the couple and force will be out of phase by an amount which will depend upon the axial separation of weights 14, 15 and weights 14′, 15′ and the angular disposition of the weights 14, 15 and 14′, 15′ on each of the shafts 11 and 12.

Various modifications may be made without departing from the invention. For example, while in the specific embodiment described above, the shafts are driven at twice engine speed, which will balance second order vibrations, similar balancers could be driven at engine speed or other multiples of engine speed to balance first or other order vibrations.

I claim:

1. A balancer comprising first and second shafts disposed parallel to one another and being adapted to be driven at the same speed in opposite directions, each shaft having a pair of axially separated weights mounted thereon, all four weights being of equal mass, the weights on each shaft defining in different diametral phases, the disposition of the weights relative to one another on each shaft being the same, each weight on one shaft being disposed at 180° to the corresponding weight on the other shaft when the centres of mass of the weights are disposed in the common axial plane of the shafts.

2. A balancer according to claim 1 in which the weights on the one shaft are axially aligned with the weights on the other shaft.

3. A balancer according to claim 1 in which the weights on one shaft are displaced axially from the weights on the other shaft.

4. A balancer according to claim 1 in which the shafts are interconnected by gears of equal diameter so that the shafts will rotate at the same speed but in opposite directions, an engine to be tested positioned adjacent the balancer and rotating at a desired speed, and means being provided on one of said shafts by which it may be driven at a multiple of the rotational speed of the engine to be tested.

5. A balancer according to claim 4 in which the shafts are driven at twice the rotational speed of the engine to be tested.

6. A balancer comprising first and second shafts disposed parallel to one another and being adapted to be driven at the same speed in opposite directions, each shaft having a pair of axially separated weights mounted thereon, all four weights being of equal mass, the weights on each shaft being disposed at different angular positions, the disposition of the weights relative to one another of each shaft being the same, each weight on one shaft being disposed at 180° to the corresponding weight of the other shaft when the centres of the mass of the weights are disposed in the common axial plane of the shafts, and the weights on one shaft being displaced axially from the weights on the other shaft.

* * * * *

UNITED STATES PATENT AND TRADEMARK OFFICE
CERTIFICATE OF CORRECTION

PATENT NO. : 4,936,268

DATED : June 26, 1990

INVENTOR(S) : Steven James RANDLE

It is certified that error appears in the above-identified patent and that said Letters Patent is hereby corrected as shown below:

Column 3, line 20 - change "phases" to "planes".

Signed and Sealed this

Seventeenth Day of December, 1991

*Attest:*

HARRY F. MANBECK, JR.

*Attesting Officer*        *Commissioner of Patents and Trademarks*